US010936425B2

(12) United States Patent
Lv et al.

(10) Patent No.: US 10,936,425 B2
(45) Date of Patent: *Mar. 2, 2021

(54) METHOD OF TRACKING AND ANALYZING DATA INTEGRITY ISSUES BY LEVERAGING CLOUD SERVICES

(71) Applicant: EMC IP Holding Company LLC, Hopkinton, MA (US)

(72) Inventors: Man Lv, Beijing (CN); Assaf Natanzon, Tel Aviv (IL); Yong Zou, Beijing (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/685,625

(22) Filed: Nov. 15, 2019

(65) Prior Publication Data
US 2020/0081790 A1  Mar. 12, 2020

Related U.S. Application Data

(63) Continuation of application No. 15/705,010, filed on Sep. 14, 2017, now Pat. No. 10,552,265.

(51) Int. Cl.
*G06F 11/07* (2006.01)
*G06F 11/14* (2006.01)
*G06F 9/455* (2018.01)

(52) U.S. Cl.
CPC ...... *G06F 11/1448* (2013.01); *G06F 9/45558* (2013.01); *G06F 2009/45591* (2013.01); *G06F 2201/815* (2013.01)

(58) Field of Classification Search
CPC .................... G06F 11/2094; G06F 3/0619

USPC ...................................................... 714/49, 54
See application file for complete search history.

(56) References Cited

U.S. PATENT DOCUMENTS

| 6,446,087 | B1 | 9/2002 | Lai |
| 8,056,076 | B1 | 11/2011 | Hutchins et al. |
| 9,002,798 | B1 | 4/2015 | Raj et al. |
| 9,864,663 | B2 | 1/2018 | Khemani et al. |
| 9,990,221 | B2 | 6/2018 | Tasoulas et al. |

(Continued)

OTHER PUBLICATIONS

U.S. Appl. No. 15/705,010, dated Mar. 21, 2019, Office Action.

(Continued)

*Primary Examiner* — Chae M Ko
(74) *Attorney, Agent, or Firm* — Workman Nydegger

(57) ABSTRACT

One example method includes detecting the occurrence of a data corruption event regarding a backup dataset created by the data protection entity, transmitting, to a data integrity check entity, a request to perform a data integrity check with respect to the backup dataset, and the backup dataset comprises a backup of an entity other than the data integrity check entity and the data protection entity, and as between the data protection entity and the data integrity check entity, no portion of the data integrity check is performed by the data protection entity, receiving, from the data integrity check entity, results of the data integrity check, and the results of the data integrity check identify a data integrity problem that resulted from the data corruption event involving the backup dataset, and taking an action, based on the results of the data integrity check, to resolve the identified data integrity problem.

20 Claims, 3 Drawing Sheets

(56) References Cited

U.S. PATENT DOCUMENTS

| | | |
|---|---|---|
| 10,489,250 B2 * | 11/2019 | Inbaraj ................. G06F 16/188 |
| 2005/0195660 A1 | 9/2005 | Kavuri et al. |
| 2005/0289436 A1 | 12/2005 | Redford |
| 2006/0174087 A1 | 8/2006 | Hashimoto et al. |
| 2011/0082841 A1 | 4/2011 | Christiaens et al. |
| 2013/0166511 A1 | 6/2013 | Ghatty et al. |
| 2013/0254326 A1 | 9/2013 | Weng et al. |
| 2017/0228417 A1 | 8/2017 | Maccanti et al. |
| 2017/0242771 A1 | 8/2017 | Khenmani et al. |
| 2017/0270007 A1 | 9/2017 | Huang et al. |

OTHER PUBLICATIONS

U.S. Appl. No. 15/705,010, dated Aug. 8, 2019, Final Office Action.
U.S. Appl. No. 15/705,010, dated Oct. 2, 2019, Notice of Allowance.

* cited by examiner

METHOD OF TRACKING AND ANALYZING DATA INTEGRITY ISSUES BY LEVERAGING CLOUD SERVICES

RELATED APPLICATIONS

This application is a continuation of, and hereby claims priority to, U.S. patent application Ser. No. 15/705,010, entitled METHOD OF TRACKING AND ANALYZING DATA INTEGRITY ISSUES BY LEVERAGING CLOUD SERVICES, and filed Sep. 14, 2017. All of the aforementioned applications are incorporated herein in their respective entireties by this reference.

FIELD OF THE INVENTION

Example embodiments of the invention relate to systems and methods for managing data. More particularly, at least some embodiments of the invention relate to systems and methods for performing integrity checks on backup data, while reducing the workload of data protection entities.

BACKGROUND

Entities typically generate and use data that is important in some way to their operations. This data can include, for example, business data, financial data, and personnel data. Accordingly, entities create and store backups of their important data that can later be used in a data restore process if necessary. Such backups are often stored in a cloud storage environment. The use of cloud storage provides some convenience and advantages in terms of cost for example, but also introduces various problems.

The creation and storage of backups is typically performed by one or more data protection entities of a data protection environment. These backup processes typically impose significant overhead costs on the data protection entities in terms of their memory, storage and CPU processes, for example. This is particularly so where backups are performed relatively frequently and/or the backup datasets are relatively large. As well, backup processes performed in connection with the data protection entities may also impose a significant load on network/bandwidth resources. This is often a concern where an enterprise must transmit its backup offsite, such as to a cloud storage platform.

A related concern with cloud based storage is that some enterprises primarily employ virtual machines (VM) to perform data protection, rather than using a purpose built backup appliance (PBBA). The VMs are somewhat disadvantageous relative to a PBBA in that parameters of the VMs are relatively harder to control, and lack flexibility. For example, the Amazon Elastic Cloud Compute (EC2) environment permits only limited configurability in terms of the data protection VMs that can be employed by an enterprise. For example, CPU, memory, and network resources cannot readily be added to that VM by the user. Consequently, these VMs are limited in terms of their functionality and capability. Some users have attempted to address this problem by using VMs of more significant capability, however, this approach results in cost increases to the user, as well as underutilized capacity and capabilities.

The use of cloud storage resources also presents concerns with respect to data integrity. Thus, enterprises have a need to employ data integrity checks in connection with their backup data. However, performance of such data integrity checks may place significant demands on computing resources such as CPU, IOPs, memory, and network resources. As noted above, existing computing systems and environments are not well suited to take on the workload imposed by data integrity checks without significant impact to system performance.

In more detail, the performance of data integrity checks can impose costs on enterprise data protection systems and/or on cloud storage resources in a variety of areas relating to data protection system performance. For example, performing data integrity checks may result in increased CPU cycles, a need for more and/or faster memory, and an increased need for input/output operations per second (IOPs) capability and network bandwidth.

In view of circumstances such as those just noted, a consequent technological problem is that current data protection environments and associated entities are not well suited to take on additional functionalities, such as data integrity checks for example. This is a matter of concern, particularly where important functionalities such as data integrity checks are desired to be implemented. Moreover, while important functionalities may be implemented, doing so can cause a significant reduction in the performance of the data protection entities and/or the data protection environment. Thus, there is a disincentive to impose additional workloads on the data protection entities and data protection environment.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
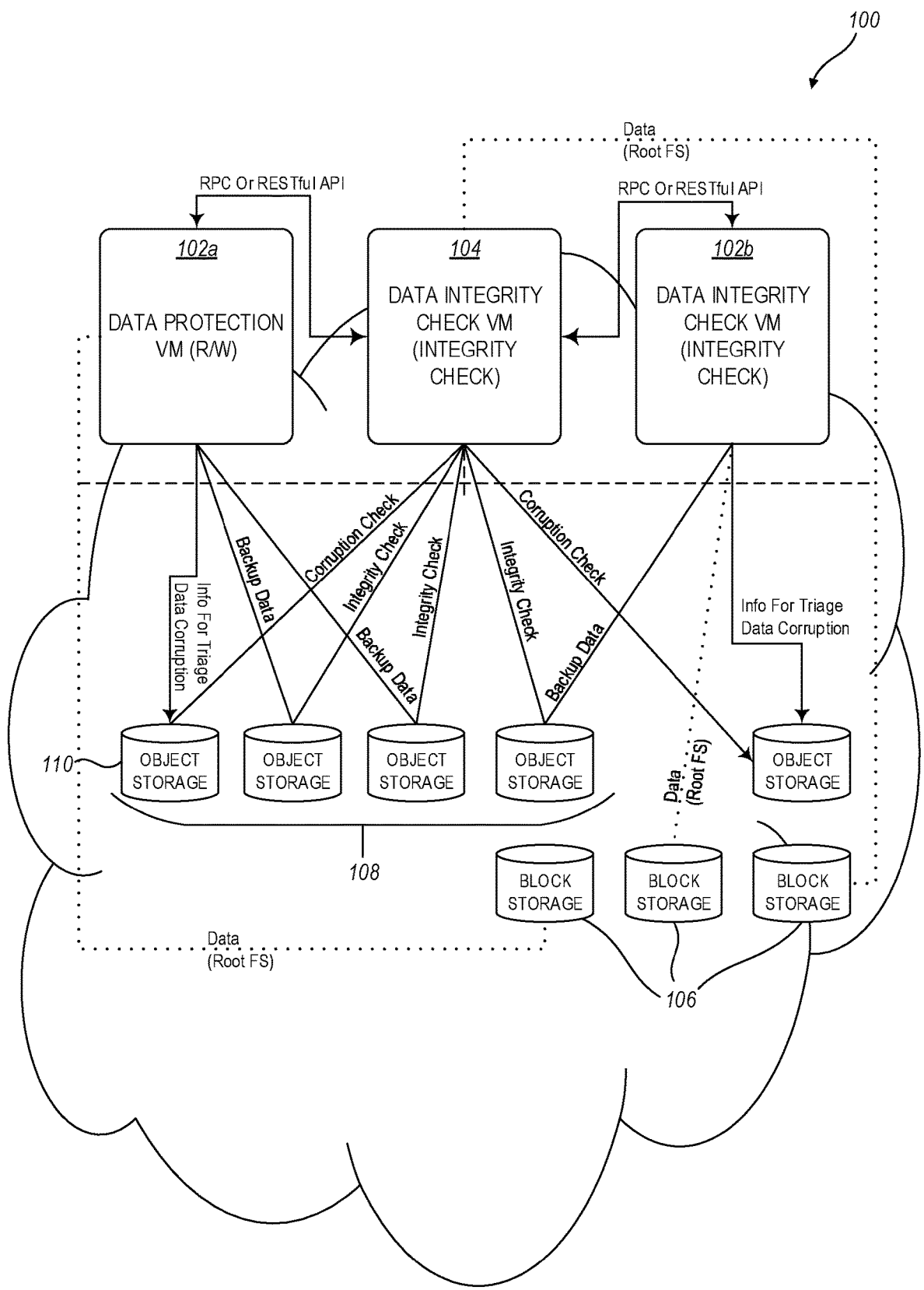
FIG. 1 illustrates an example of an operating environment in which data integrity checks may be performed.

Example embodiments of the invention generally relate to systems and methods for managing data. More particularly, at least some embodiments of the invention concern systems, hardware, software, computer-readable media, and methods directed to performing data integrity checks in a data protection environment.

In light of the technological problems noted herein, and others, what is needed are ways to allocate data protection related functionalities, such as data integrity checks for example, in a way that enables those functionalities to be performed efficiently and effectively, but without imposing significant costs on data protection environment entities. In this way, resources in the data protection system are less likely to be overutilized, with the result that there may be an improvement in the overall performance of the data protection environment, including the performance of backup processes and data integrity check processes.

It would also be advantageous to improve processes performed in a data protection environment so that data integrity checks can be performed in connection with those processes without significantly compromising the performance of those processes. It would further be advantageous to perform data integrity checks without imposing significant additional overhead costs, such as in terms of memory usage, storage, and CPU processes for example, on data protection entities.

Thus, at least some embodiments of the invention may solve one or more of the technological problems noted herein, and/or others, by providing for dedicated data integrity check entities, such as a data integrity check virtual machine (VM) for example, that operates on the same data set as a data protection VM. This approach to the performance of data integrity checks may be counterintuitive as the addition of one or more data integrity check VMs in a data protection environment introduces an additional degree of expense and complexity to the data protection environment.

As will be apparent from this disclosure however, embodiments of the invention are advantageous inasmuch as they implement technological advances and improvements to existing data protection systems and processes. For example, the allocation of functions disclosed herein enables the data integrity check workload to be performed efficiently by the data integrity check VM, thereby avoiding imposition of any significant additional overheads on the data protection VM and/or on other entities in the data protection environment. In at least some embodiments, a data integrity check is performed on a backup dataset that has been stored, for example, in a cloud storage datacenter.

A. Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in connection with a storage environment which may comprise, or consist of, a storage array. The storage environment can take various forms, including a cloud storage environment, an on-premises storage environment, or a hybrid storage environment that includes public and private elements, although the scope of the invention is not limited to any particular type of storage environment.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as filesystem, document, file, block, or object may be used by way of example, the principles of the disclosure are not limited to any particular form of representing, organizing, or storing, data or other information. Rather, such principles are equally applicable to any object capable of representing information.

With reference now to FIG. 1, details are provided concerning aspects of an operating environment for at least some embodiments of the invention, one example of which is denoted generally at 100. In general, various data protection operations can be carried out in the operating environment 100. Such operations may include, for example, initiating a backup, generating backup streams, performing a backup, storing a backup, restoring a backup, detecting a corruption event, identifying a data corruption, and performing a data integrity check.

The example operating environment 100 may include a group of data protection entities 102, such as a data protection VM 102a and data protection VM 102b, in a cloud computing environment. In general, the data protection VMs 102 take user data and persist, or back up, that user data into cloud object storage. Each data protection VM 102 has a file system and owns the data in the file system. As discussed below, the cloud computing environment where the data protection VMs 102 reside can be part of, or communicate with, a cloud storage platform such as a cloud datacenter for example.

The data protection VMs can be connected with each other and/or with other entities in the operating environment 100 using an Ethernet interconnection, although that is not necessarily required. Likewise, it is not required that the data protection entities 102 be VMs. As indicated in FIG. 1, each of the data protection VMs 102a and 102b are configured to execute both read (R) and write (W) processes. In other embodiments, one or more of the data protection VMs 102a and 102b may be configured to perform only read operations, or only write operations. More generally, one or more of the data protection VMs 102a and 102b can take the form of a backup server, or a backup and restore server. In some particular embodiments, one or more of the data protection VMs 102a and 102b can take the form of an EMC NetWorker server, or an EMC Avamar server.

As further indicated in FIG. 1, a data integrity check VM 104 is also provided that is configured to communicate with the data protection entities 102. In other implementations, multiple data integrity check VMs 104 may be provided. It should be noted that one-to-one mapping, for example, between data protection VMs 102 and data integrity check VMs 104 is not required. Rather, the number of data integrity check VMs 104 in a particular environment may depend on the size of the datasets expected to be handled, and the capabilities of the data integrity check VM 104.

In at least some embodiments, the data protection VMs 102 and the data integrity check VM 104 reside locally at an enterprise premises, but are configured to communicate with an off-premises cloud storage datacenter, or other type of datacenter. In other embodiments, the data protection VMs 102 and/or the data integrity check VM 104 may be elements of a cloud storage datacenter, and are configured to communicate with one or more remote clients whose data is to be protected.

In the example of FIG. 1, both the data protection VMs 102a and 102b, as well as the data integrity check VM 104, use a block storage array 106 for their root file system. That is, the operating system (OS) of the data protection VMs 102a and 102b, and the OS of the data integrity check VM 104, are located in the block storage array 106. In general, user data that is protected by the data protection VMs 102a and 102b can be stored in a cloud storage environment, one example of which is the Amazon Simple Storage Service (S3) storage environment.

As indicated in FIG. 1, the data protection VMs 102a and 102b, as well as the data integrity check VM 104, can communicate with a cloud storage environment 108. The cloud storage environment 108 may include object storage 110, where user data of one or more clients (not shown) is stored by the data protection VMs 102a and 102b in connection with the performance of one or more data protection processes. The block storage array 106 may, or may not, form a part of the cloud storage environment 108.

It was noted above that the data protection VMs 102a and 102b are configured to communicate with the data integrity check VM 104 by way of respective communication links. In some particular embodiments, this communication takes the form of remote procedure calls (RPC), or Representational State Transfer (RESTful) Application Program Interface (API). Alternative forms of communication could be used however. In general, the communication links between the data integrity check VM 104 and one or more data protection VMs 102a and 102b enables the data protection VMs 102 to provide information to the data integrity check VM 104 concerning what data of a particular dataset should be checked for integrity, and where, relative to that dataset, to begin the integrity check.

As further indicated in FIG. 1, the data integrity check VM 104 may store, and access, data corruption check information and data integrity check information in the object storage array 110 of the cloud storage environment 108. As well, in addition to storing user data, also referred to as backup data in FIG. 1, in the object storage array 110, the data protection VMs 102a and 102b may also store information that enables the detection and triaging of data corruption events. This information, which may be identified and selected by the data protection VMs 102a and 102b, can also be stored in the object storage array 110 of the cloud storage environment 108. The data protection VMs 102a and 102b can also select a particular format for the aforementioned information.

Depending upon the particular implementation, a data integrity check may be performed in the operating environment 100 on any suitable basis. Thus, in one particular implementation, a data integrity check is performed on a per-object basis. In one example alternative approach, a shadow file system (FS) can be directly brought up that is based on the objects provided by a data protection VM, and an integrity check performed at the file system level. This is possible because a data protection VM may employ an append-only method to boost performance. As a result, once data is backed up by the data protection VM, it would not be changed. Because of this, the shadow file system can be brought up with the data integrity check VM, and read-only run operations on the shadow file system to check data integrity.

B. Example Host Configuration

Figure 2:
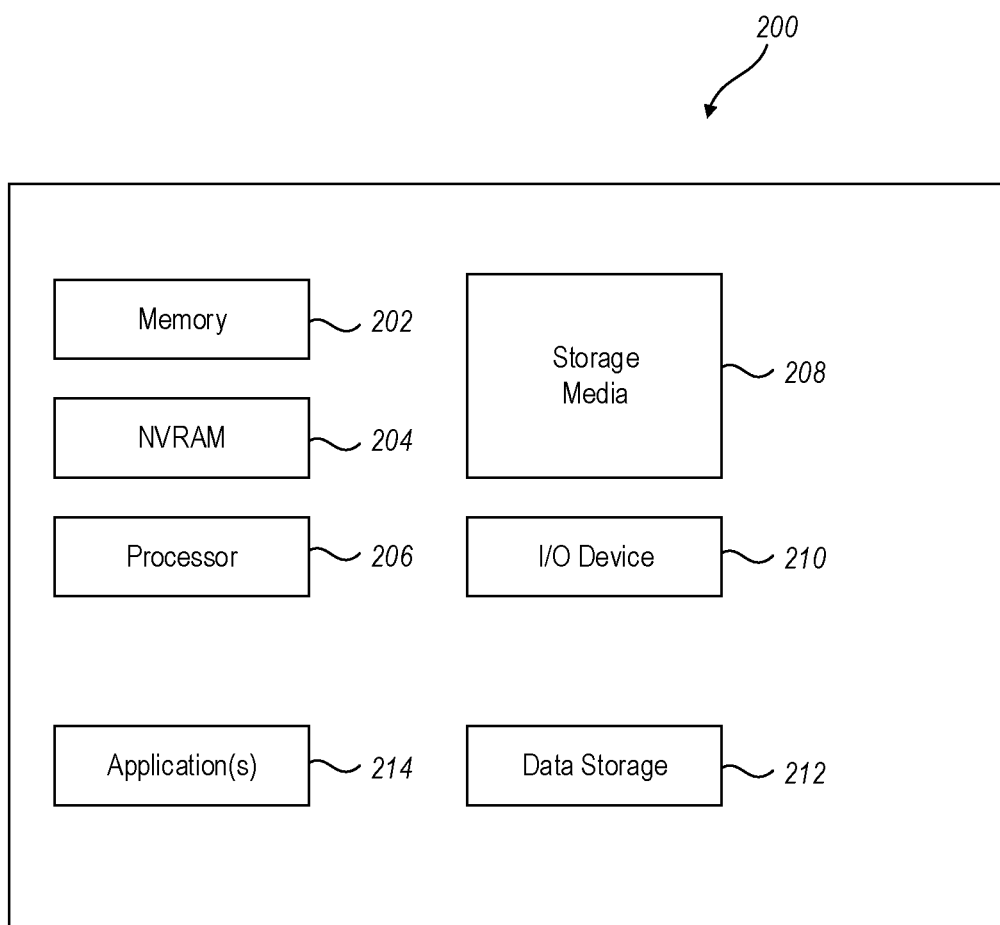
FIG. 2 discloses aspects of an example physical computing device configuration.

Turning briefly now to FIG. 2, any one or more of the data protection VMs 102, data integrity check VM 104, block storage 106, and object storage 100 can take the form of a physical computing device, one example of which is denoted at 200. In the example of FIG. 2, the physical computing device 200, which may be a host, includes a memory 202 which can include one, some, or all, of random access memory (RAM), non-volatile random access memory (NVRAM) 204, read-only memory (ROM), and persistent memory, one or more hardware processors 206, non-transitory storage media 208, I/O device 210, and data storage 212. One or more of the memory components of the physical computing device can take the form of solid state device (SSD) storage. As well, one or more applications 214 are provided that comprise executable instructions. Such executable instructions can take various forms including, for example, a data protection application such as a backup application, a data integrity check application, and any application that enables mounting of a backed up file at a client.

C. Data Integrity Check VM

With the discussion of FIG. 1 in view, embodiments of the invention implement a variety of useful functionalities. To begin with, the data integrity check workload is assigned to a dedicated external VM, that is, a VM that is external to the cloud storage environment. In such a configuration, the data protection VM and data integrity check VM run on the same dataset. Writes, if any, to that data set are performed by the data protection VM, but the data protection VM does not perform an integrity check of the data in the dataset. On the other hand, the data integrity check processes performed by the data integrity check VM only employ read operations with respect to the data set. If the data integrity check VM should detect any kind of data integrity problem or violation, the data protection VM will be notified by the data integrity check VM.

D. Information Set for Data Integrity Check

Among other things, the data protection VM is responsible for generating an information set that can be checked by the data integrity check VM in the event that a data corruption event is identified. More particularly, this information set can be used to detect and triage data corruption issues. In at least some embodiments, this information set is stored in remote storage, such as a cloud storage environment, in order to ensure that the information which is used to detect and triage data corruption issues is not in the same failure domain with the data protection VM. That is, if the data protection VM should experience a failure, the information set is still accessible by the data integrity check VM.

While the data protection VM performs a checksum process in connection with protection of a dataset, the data protection VM does not evaluate the results of the process. Rather, as noted above, the results are simply stored by the data protection VM as part of an information set for later checking by the data integrity check VM in the event that a data corruption event is detected. The information set can also include, in addition to checksum information, time stamp, logical block addressing (LBA) range or information identifying the data offset within the object, the writer, and application specific data such as container ID. In some embodiments, a checksum is used to assure that the aforementioned information is, itself, valid. Thus, in order for the data integrity check VM to use the information in the information set, a checksum of that information must first be performed.

E. Data Access Credential Sharing and Interconnection

In order to perform a data integrity check for a data protection VM, the data integrity check VM needs a data access credential from the data protection VM. In some embodiments, the data integrity check VM can obtain this data access credential when the communication links between the data protection VMs and data integrity check VM(s) are setup as a result of any of the data protection VMs or data integrity check VMs being started or restarted. That is, upon start or restart of any of the aforementioned VMs, the data protection VM may automatically supply the data access credential to the data integrity VMs. Alternatively, upon start or restart of any of the aforementioned VMs, the data integrity check VM may automatically request the data access credential from the data protection VMs.

F. Example VM Failure Cases

According to at least some embodiments, when a data protection VM or data integrity check VM fails, the other VMs in the operating environment will not be impacted. For example, if a data integrity check VM fails, before it is restarted by a cloud storage infrastructure, the data protection VMs will continue with their normal data services and operations. As another example, if a data protection VM fails, the data integrity check VM will continue with its normal operations. In case of any violation during a data integrity check process, a message will be queued by the data integrity VM and then sent to the data protection VM after the data protection VM has been restarted. If for some reason the data protection VM cannot recover within a specified timeframe, such as within 30 minutes after failure for example, then the data integrity check VM operations may be stopped until such time as the data protection VM is successfully restarted, or replaced.

G. Example Operations of a Data Integrity Check VM

When a data corruption event is detected, such as by the data protection VM and/or another entity, detection of the data corruption event can be communicated by the data protection VM to the data integrity VM. As noted herein, this communication can also include, for example, identification of the data set in which the data corruption event occurred, and can include information indicating to the data integrity check VM where in the dataset performance of the data integrity check should begin.

After receipt of the notice of a data corruption event, the information set created by the data protection VM is checked by the data integrity VM to triage the issue. The data integrity check VM is also able to access the object storage and the dataset written by the data protection VMs, in order to determine where the data corruption event occurred. The results of the data integrity check can then be reported to the data protection VMs and/or other entities.

The data integrity check VM can be configured to perform one or more data integrity checks based on various policies. For example, a policy may specify that a data integrity check will be performed on some periodic basis. Another example policy may specify that a data integrity check will be performed in response to the occurrence of a triggering event, or in response to the non-occurrence of a particular event within a specified time frame. Still other policies can be based on other criteria, and may be created and implemented ad hoc by a user, such as by way of the data integrity check VM. The policies can be stored at the data integrity check VM and/or elsewhere.

H. Advantageous Aspects of Some Example Embodiments

While none of the disclosed embodiments are required to provide or enable any particular advantage, it will be apparent from this disclosure that certain advantages may be obtained with at least some example embodiments, some of which were discussed earlier herein. Another example of such advantages concerns cost reduction. For example, because the data integrity check functionality is provided in a dedicated VM, the data integrity check workload is not imposed on the data protection VMs. More generally stated, the data integrity check is performed by an entity other than a data protection entity, such as a data protection VM.

Thus, the data protection VMs can use relatively less expensive components, such as CPUs for example, than would otherwise be the case. In one particular example involving a cloud storage environment, two less powerful VMs can be used instead of a single, relatively more powerful, data protection VM, and at a cost savings. Moreover, the savings may be significant in data protection environments where a large number of data protection VMs are deployed.

As another example, embodiments of the invention may constitute an improvement on conventional processes in that they provide for collection and storage of a rich information set concerning data protection processes. This information set can then be used during a data integrity check process to determine a cause for data corruption that has been detected. This determination can be made relatively more efficiently due to the nature and/or volume of information contained in the information set.

As a final example, embodiments of the invention may also implement improvements over conventional processes in terms of IO performance. For example, since the data integrity check process performed by the data integrity check VM does not share the same data path with normal data protection processes performed by the data protection VMs, there is no contention between the two processes. Thus, the overall system IO performance is relatively better than would otherwise be the case.

I. Aspects of Some Example Methods

Figure 3:
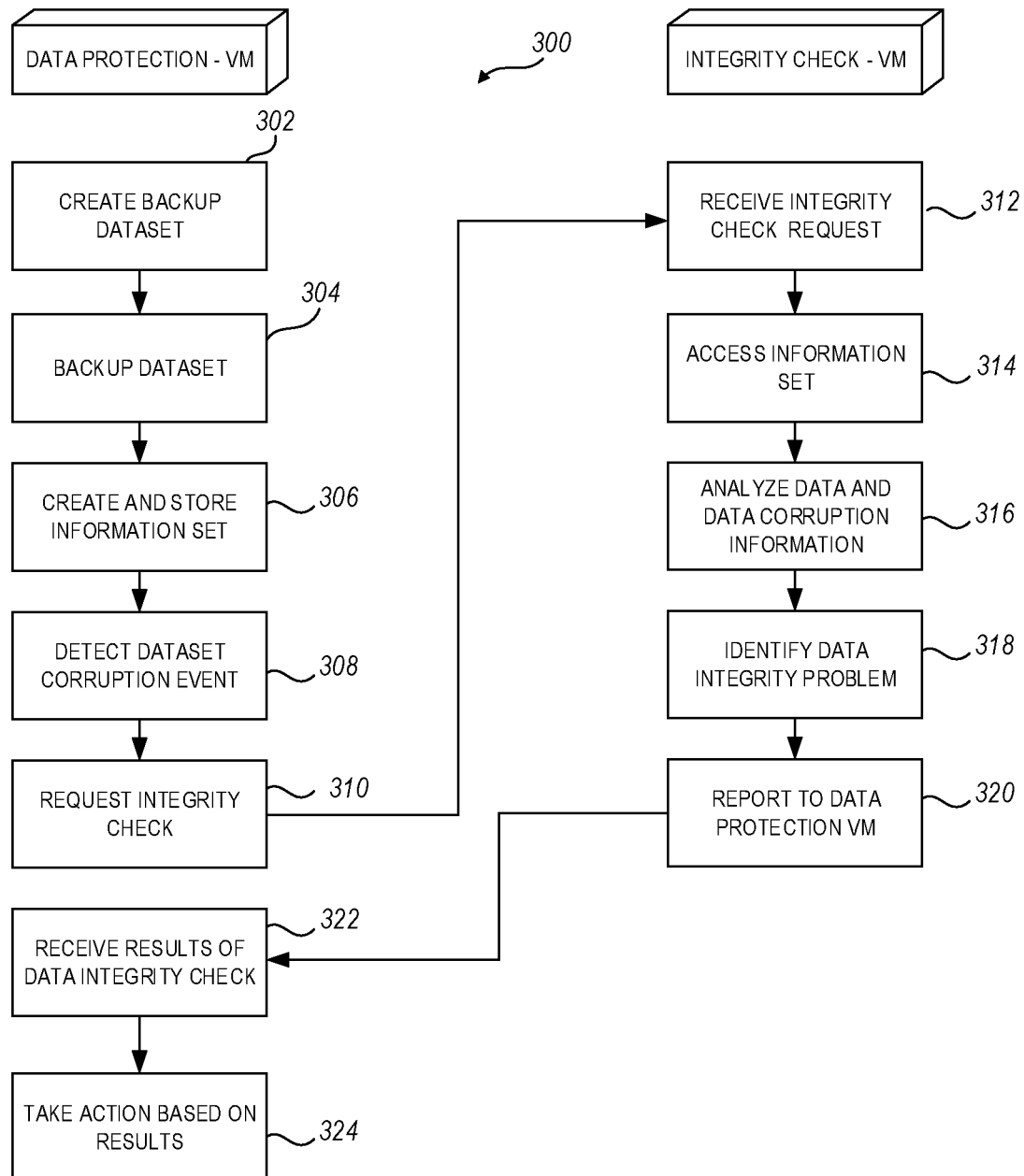
FIG. 3 is a flow diagram illustrating aspects of an example method for performing a data integrity check.

With attention now to FIG. 3, details are provided concerning some example methods for performing a data integrity check, where one example of such a method is denoted generally at 300. The method 300 can be performed in an operating environment such as the example operating environment 100 in FIG. 1, although no particular operating environment is necessarily required. In some embodiments at least, the data integrity check portion of the method 300 can be performed by a dedicated entity, such as a data integrity check VM. As indicated in FIG. 3, the data integrity check VM can interact with a data protection VM in some operations.

The example method 300 can begin when a backup server, such as a data protection VM, creates a backup dataset 302. The data in the backup dataset may be client or user data that is desired to be protected. The backup dataset can then be stored 304 by the data protection VM, either locally or off premises such as at a cloud datacenter. As part of creation of the backup dataset, the data protection VM may create an information set 306 that includes information relating to the backup dataset. The information set may be stored with the backup dataset, or separately from the backup dataset.

At some point after storage of the backup dataset and the associated information set, the data protection VM may detect, or otherwise become aware of, 308 a data corruption event or data corruption problem concerning the backup dataset. The data protection VM may then request 310 that a data integrity check be performed with respect to the backup dataset in order to determine, for example, the source and nature of the data corruption. The request 310 may, but does not necessarily, include information about the identity of the dataset, and the location in the dataset where the data integrity check process should begin.

The request 310 from the data protection VM is communicated to, and received by 312 the data integrity check VM. This communication may take the form of, for example, an RPC or RESTful API, although neither is required. After receipt 312 of the request for the data integrity check, the data integrity check VM then accesses 314 the information set that was created and stored by the data protection VM in connection with the backup of the backup dataset. The information set may reside in object storage.

Using the information in the information set that has been accessed, the data integrity check VM can then analyze the backup dataset and data corruption information 316 to identify the corruption problem and its nature 318. In some embodiments, this analysis includes, but is not limited to, performance of a checksum or cyclical redundancy check (CRC), or any other process(es) that can identify the affected data and/or the nature of the corruption problem. Once the data corruption problem has been identified, and the affected data identified, a report may then be made 320 by the data integrity check which is received 322 by the data protection VM. The data protection VM may then take appropriate action 324 to resolve the data corruption problem that has been identified.

As can be seen from FIG. 3, separate data paths are used, respectively, for the data backup process performed by the data protection VM, and the data integrity check performed by the data integrity check VM. Thus, there is no contention between the two processes when the data integrity check process is performed only by the data integrity check VM and not by the data protection VM.

J. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   detecting, by a data protection entity, the occurrence of a data corruption event regarding a backup dataset created by the data protection entity;
   transmitting by the data protection entity, to a data integrity check entity, a request to perform a data integrity check with respect to the backup dataset, and the backup dataset comprises a backup of an entity other than the data integrity check entity and the data protection entity, and as between the data protection entity and the data integrity check entity, no portion of the data integrity check is performed by the data protection entity;

receiving, from the data integrity check entity, results of the data integrity check, and the results of the data integrity check identify a data integrity problem that resulted from the data corruption event involving the backup dataset; and taking an action, based on the results of the data integrity check, to resolve the identified data integrity problem.

2. The method as recited in claim 1, wherein the data protection entity is a data protection VM and/or the data integrity check entity is a data integrity check VM.

3. The method as recited in claim 1, further comprising creating and storing, by the data protection entity, an information set associated with the backup dataset.

4. The method as recited in claim 3, wherein the information set includes any one or more of checksum information, time stamp, logical block addressing (LBA) range or information identifying a data offset within an object, identity of an application that created data included in the backup dataset, and application specific data.

5. The method as recited in claim 3, wherein the information set is stored in a failure domain that is different from a failure domain in which the data protection VM operates.

6. The method as recited in claim 1, wherein the data protection entity communicates with the data integrity check entity by way of an RPC or RESTful API.

7. The method as recited in claim 1, further comprising supplying, by the data protection entity, a data access credential to the data integrity check entity.

8. The method as recited in claim 1, further comprising creating, by the data protection entity, the backup dataset.

9. The method as recited in claim 8, wherein the data protection entity creates the backup dataset using a data path that is not employed by the data integrity check entity.

10. The method as recited in claim 1, wherein the method is performed by the data protection entity at a cloud datacenter.

11. A non-transitory storage medium having stored therein instructions which are executable by one or more hardware processors to perform operations comprising:

detecting, by a data protection entity, the occurrence of a data corruption event regarding a backup dataset created by the data protection entity;

transmitting by the data protection entity, to a data integrity check entity, a request to perform a data integrity check with respect to the backup dataset, and the backup dataset comprises a backup of an entity other than the data integrity check entity and the data protection entity, and as between the data protection entity and the data integrity check entity, no portion of the data integrity check is performed by the data protection entity;

receiving, from the data integrity check entity, results of the data integrity check, and the results of the data integrity check identify a data integrity problem that resulted from the data corruption event involving the backup dataset; and taking an action, based on the results of the data integrity check, to resolve the identified data integrity problem.

12. The non-transitory storage medium as recited in claim 11, wherein the data protection entity is a data protection VM and/or the data integrity check entity is a data integrity check VM.

13. The non-transitory storage medium as recited in claim 11, wherein the operations further comprise creating and storing, by the data protection entity, an information set associated with the backup dataset.

14. The non-transitory storage medium as recited in claim 13, wherein the information set includes any one or more of checksum information, time stamp, logical block addressing (LBA) range or information identifying a data offset within an object, identity of an application that created data included in the backup dataset, and application specific data.

15. The non-transitory storage medium as recited in claim 13, wherein the information set is stored in a failure domain that is different from a failure domain in which the data protection VM operates.

16. The non-transitory storage medium as recited in claim 11, wherein the data protection entity communicates with the data integrity check entity by way of an RPC or RESTful API.

17. The non-transitory storage medium as recited in claim 11, wherein the operations further comprise supplying, by the data protection entity, a data access credential to the data integrity check entity.

18. The non-transitory storage medium as recited in claim 11, wherein the operations further comprise creating, by the data protection entity, the backup dataset.

19. The non-transitory storage medium as recited in claim 18, wherein the data protection entity creates the backup dataset using a data path that is not employed by the data integrity check entity.

20. The non-transitory storage medium as recited in claim 11, wherein the non-transitory storage medium is performed by the data protection entity at a cloud datacenter.

* * * * *